W. MORAVA.
COTTON CROP SEPARATOR.
APPLICATION FILED AUG. 9, 1920.

1,409,307.

Patented Mar. 14, 1922.
4 SHEETS—SHEET 1.

WITNESS
P.F. Gathmann

INVENTOR
Wensel Morava
BY Burton & Burton
HIS ATTORNEYS

W. MORAVA.
COTTON CROP SEPARATOR.
APPLICATION FILED AUG. 9, 1920.

1,409,307.

Patented Mar. 14, 1922.
4 SHEETS—SHEET 4.

WITNESS

INVENTOR
Wensel Morava.
BY
HIS ATTORNEYS

UNITED STATES PATENT OFFICE.

WENSEL MORAVA, OF CHICAGO, ILLINOIS.

COTTON-CROP SEPARATOR.

1,409,307.  Specification of Letters Patent.  Patented Mar. 14, 1922.

Application filed August 9, 1920. Serial No. 402,481.

*To all whom it may concern:*

Be it known that I, WENSEL MORAVA, a citizen of the United States, and a resident of the city of Chicago, in the county of Cook and the State of Illinois, have invented certain new and useful Improvements in Cotton-Crop Separators, of which the following is a specification, reference being had to the accompanying drawings, forming a part thereof.

The purpose of this invention is to provide an improved apparatus adapted for the purpose of separating the unopened bolls of a cotton crop from the open bolls and refuse and for like use in respect to any other similarly conditioned material of which a part is adapted to roll down an inclined surface while the remainder is not thus adapted. It consists in the elements and features of construction shown and described, as indicated in the claims.

Figure 1:
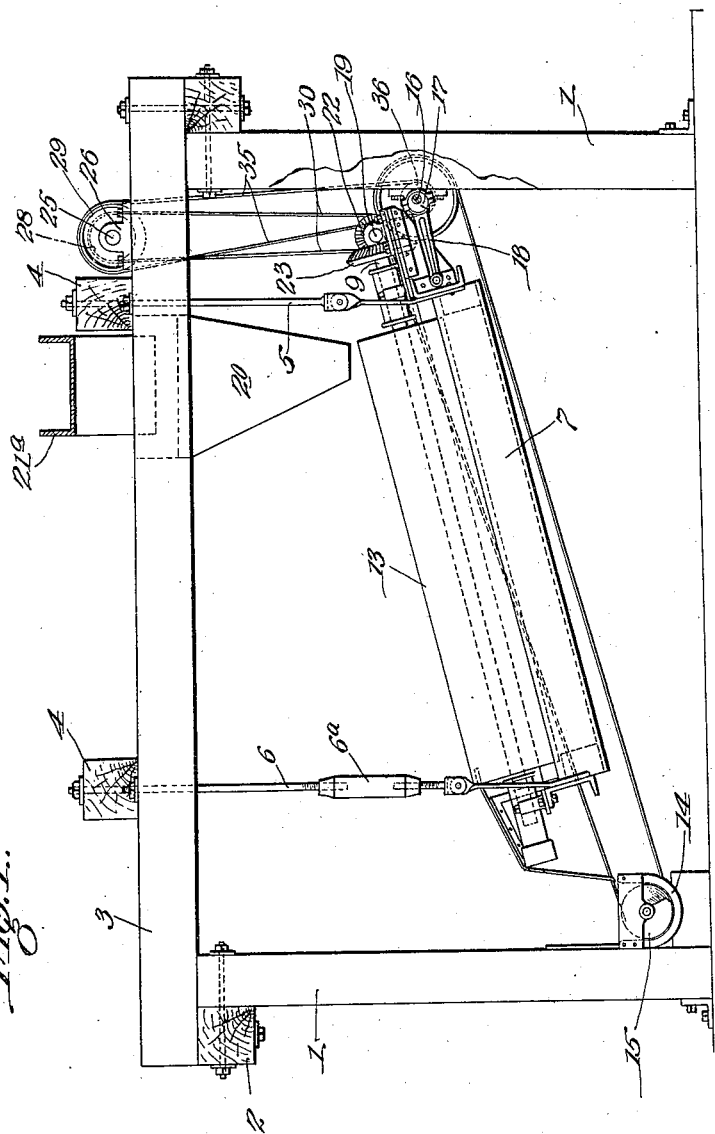
Figure 1 is an end elevation of an apparatus embodying this invention.
Figure 2:
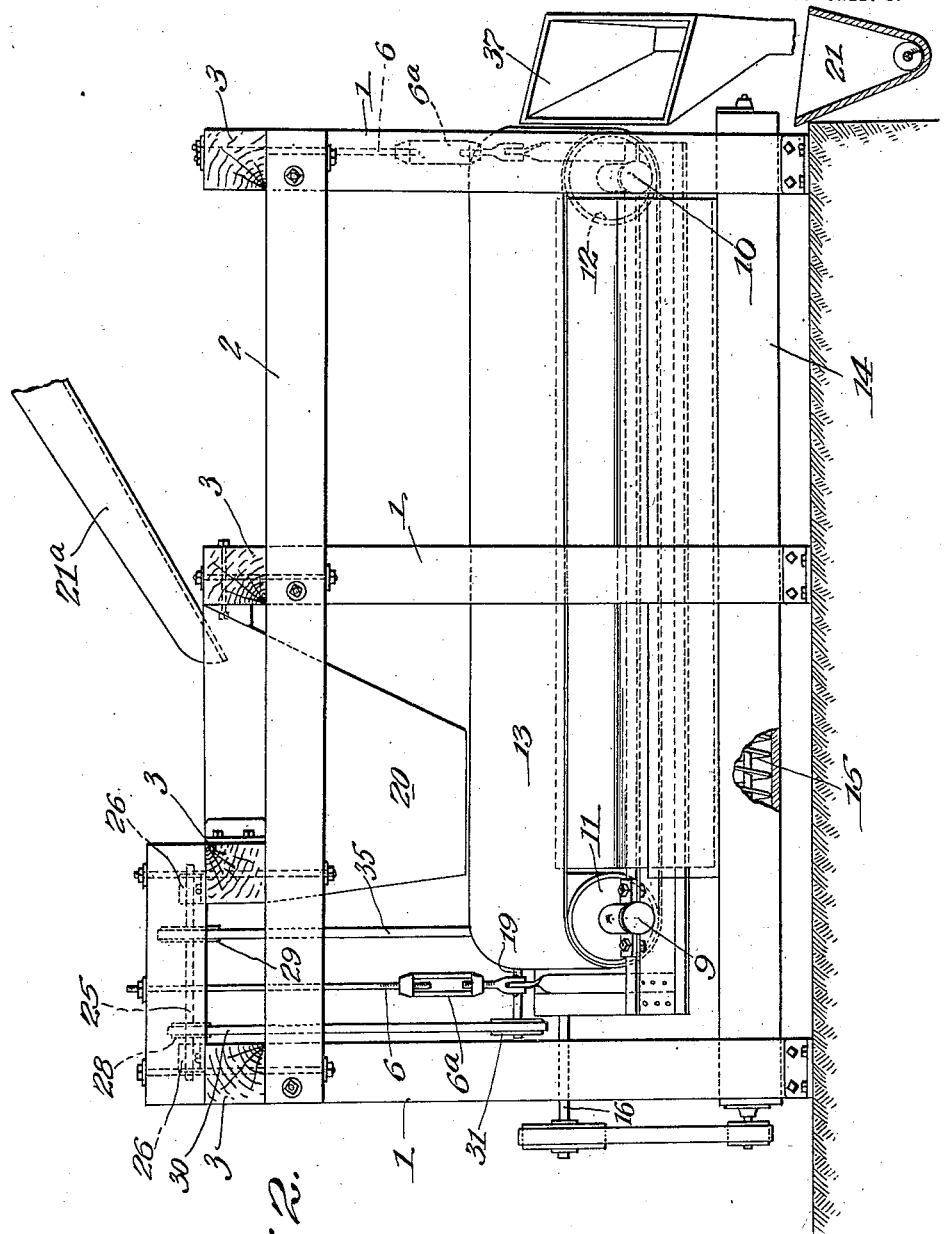
Figure 2 is a front elevation of the same.
Figure 3:
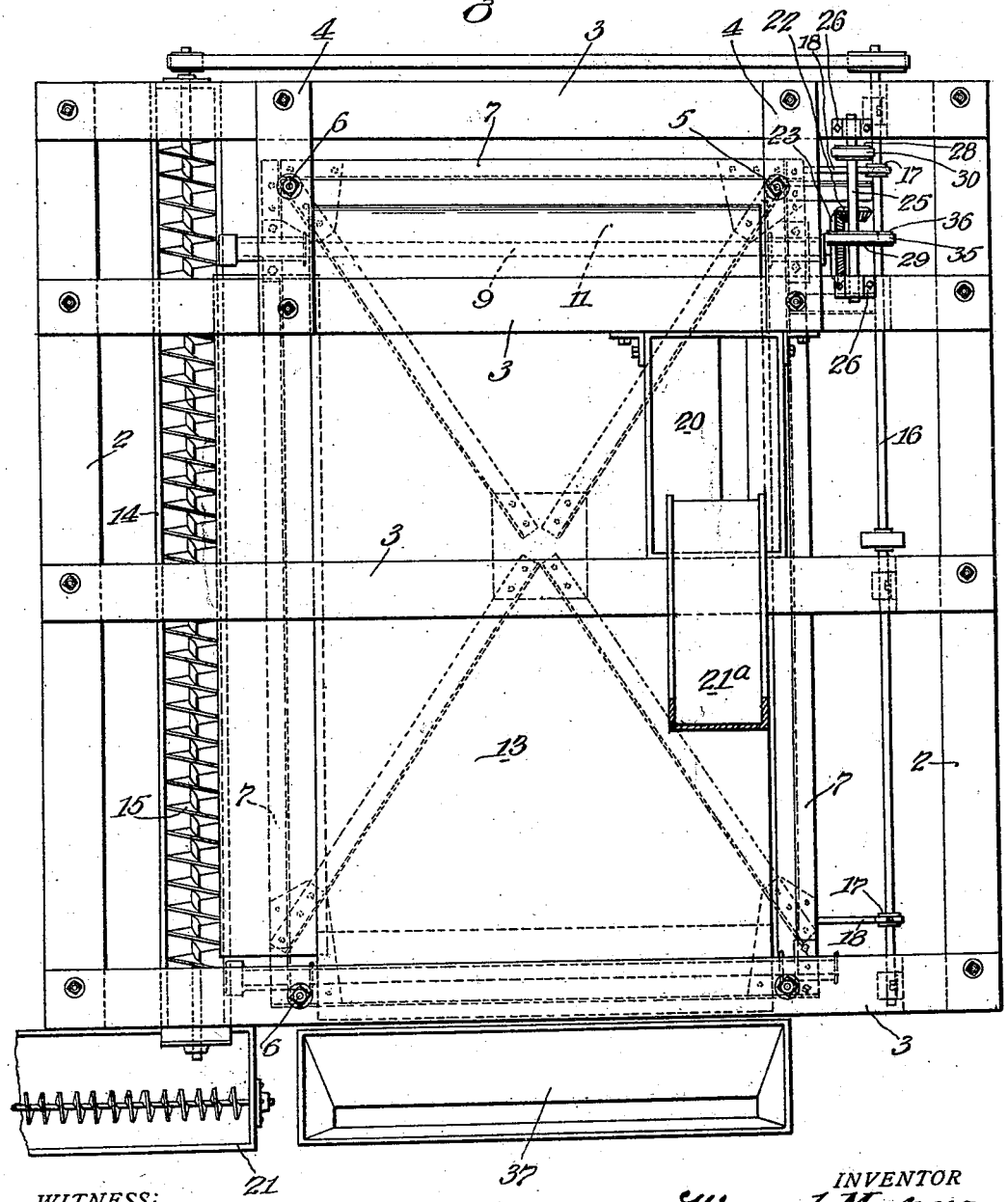
Figure 3 is a plan view of the same.
Figure 4:
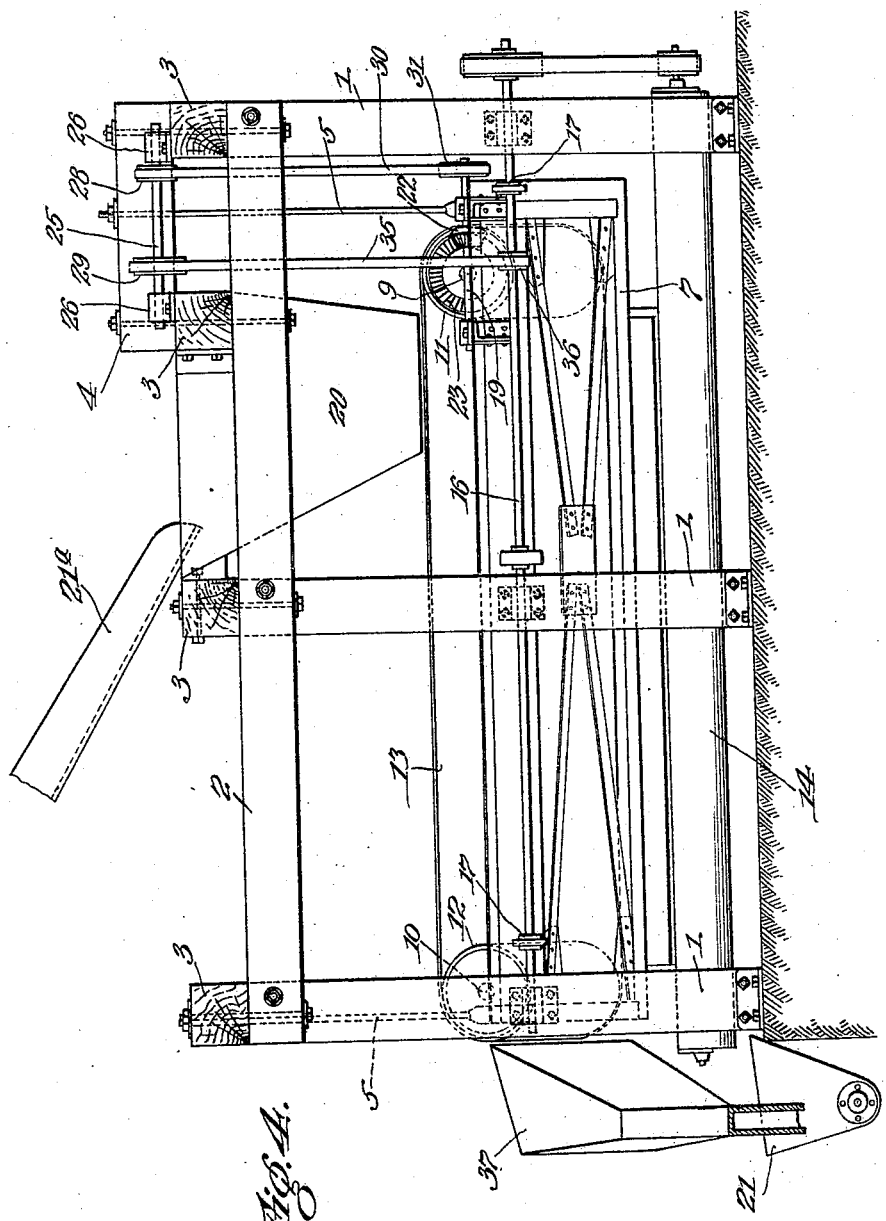
Figure 4 is a rear side elevation of the same.

The construction shown in the drawings comprises supporting frame work, (which may be in part the frame structure of the building in which the apparatus is contained), represented by upright posts, 1, overhead and transverse and longitudinal frame members, 2 and 3, with suitable bracing members, 4. From this supporting frame structure there is suspended by suspending bars, 5, 5, at the higher side and by extensible and contractible suspending links, 6, 6, at the lower side, an inclined endless conveyer frame, 7, in which there are journaled the shafts, 9 and 10, of the driving and idler rollers, 11 and 12, of an endless conveyer belt 13; and extending along the lower side of said conveyer belt this frame carries a receiving trough, 14, in which there is located a spiral conveyer, 15, rotated as hereinafter described for propelling the material which may be delivered into it from the inclined conveyer, for discharge at one end of said trough. 16 is a shaft journaled upon the main supporting structure which comprises the upright posts, 1, extending along the higher side of the conveyor, having near its opposite ends eccentrics, 17, 17 which are connected by the eccentric pitman links, 18, 18, with the conveyer frame for oscillating said frame back and forth transversely of the direction of travel of the conveyor, for giving a joggling or jarring movement to the material lying upon the inclined surface of the conveyor belt during the travel in the direction transverse to said jarring movement. 20 is a hopper overhanging the entrance end of the conveyer belt at the higher side thereof, into which a chute, 21ª, discharges for delivering onto the belt the material to be separated, said material consisting of the cotton crop as taken from the cotton plant bodily, comprising opened and unopened bolls, twigs, leaves and the like, from which the unopened bolls which are still in condition sufficiently nearly round to roll down the slight incline, are to be separated while the material is being carried by the conveyer.

25 is an overhead countershaft journaled in bearings, 26, 26, mounted upon the overhead portion of the main supporting structure. The shaft, 25, carries two driving wheels, 28 and 29. From the wheel, 28, a drive belt, 30, extends around a driven wheel, 31, on the shaft, 19, for actuating the endless belt conveyer by means of the bevel gears, 22 and 23, on the shafts, 19 and 9, respectively. From the wheel, 29, a driving belt, 35, extends about a driven wheel, 36, on the shaft, 16, having the eccentrics, 17, for oscillating and agitating the conveyer as already described.

The relative size of the power-transmitting wheel for driving the conveyer and for agitating it are such as to give any desired rapidity of agitation relative to the speed of travel of the conveyer belt; and these relations will be determined by experience with the various material and various conditions of material operated upon; but, in general, it is considered that the conveyer belt travel is comparatively slow and that the movement of agitation is rapid enough to give what may be called a jerky movement to the conveyer for the purpose of starting the rolling of any bolls which may be partly opened or otherwise irregular so as not to roll easily, but not abrupt enough to cause any substantial sliding of the material which is not adapted to roll, as the twigs and leaves and fully opened bolls, it being designed that this latter class of material shall be carried by the conveyer over its entire path of travel and delivered at the delivery side thereof, to the hopper, 37, provided for receiving and conducting it to the machine or place where it is next to be treated for separation of the fiber from the refuse.

The bolls rolling down from the inclined conveyer and received in the trough, 14, are conducted by the spiral conveyer therein to the delivery end thereof where a hopper, 21, is provided leading into a conduit or receptacle from or by which they may be conducted to an apparatus for ripening and further treating them.

It will be recognized that the relation between the angle of inclination or slope of the conveyer, and the rapidity of the joggling or jarring movement which the conveyer receives may require variation according to the varied condition of the material. This variation may be effected by varying either the speed of the jarring movement or the inclination of the conveyer. In the construction shown, provision is made for varying the latter, as being more easily provided for than the variation of speed of the joggling movement. For varying the inclination of the conveyer, suspending links, 6, 6, which uphold its lower side are made adjustable by turn-buckles, 6ª, with which they are each provided.

I claim:—

1. In an apparatus for the purpose indicated in combination with a frame, a driving and an idle roller and an endless carrier carried thereby; a rotation-modifying train anterior to and actuating the driving roller, said train having its several shafts and wheels journaled in said frame; a belt-actuated wheel on the prime shaft of said train; means for movably upholding said frame at its upper and lower side respectively, said means being adapted for swinging movement of said frames bodily substantially parallel to the plane of the belt-actuated wheel, and means for vibrating said frame bodily horizontally in the general direction of said frame.

2. In a construction for the purpose indicated in combination with a frame, a driving and an idle roller and an endless carrier carried thereby; an actuating gear train for the driving roller having its several shafts and wheels journaled in said frame; a belt-actuated wheel on the prime shaft of said train; means for suspending said frame at one side, and means for supporting it movably at the opposite side, both of said suspending and supporting means being adapted for swinging movement of said frame bodily substantially parallel to the plane of the belt-actuated wheel, and means for vibrating said frame bodily horizontally in the general direction of said plane.

3. In the construction defined in claim 1, means for supporting the frame of said endless carrier at one side so as to be movable bodily transversely of the carrying movement of the carrier, carrier-actuating means at that side, means for suspending the frame at the opposite side and means for adjusting the suspending means to vary the transverse inclination of the carrier.

In testimony whereof, I have hereunto set my hand at Chicago, Illinois, this 6th day of August, 1920.

WENSEL MORAVA.